E. C. ALLEN.
FOCUSING MECHANISM FOR CAMERAS.
APPLICATION FILED MAR. 23, 1914.

1,146,837.

Patented July 20, 1915.
2 SHEETS—SHEET 1.

Witnesses
Nelson H. Copp
Russell B. Griffith

Inventor
Ernest C. Allen
By Church & Rich
his Attorneys

E. C. ALLEN.
FOCUSING MECHANISM FOR CAMERAS.
APPLICATION FILED MAR. 23, 1914.
1,146,837.
Patented July 20, 1915.
2 SHEETS—SHEET 2.
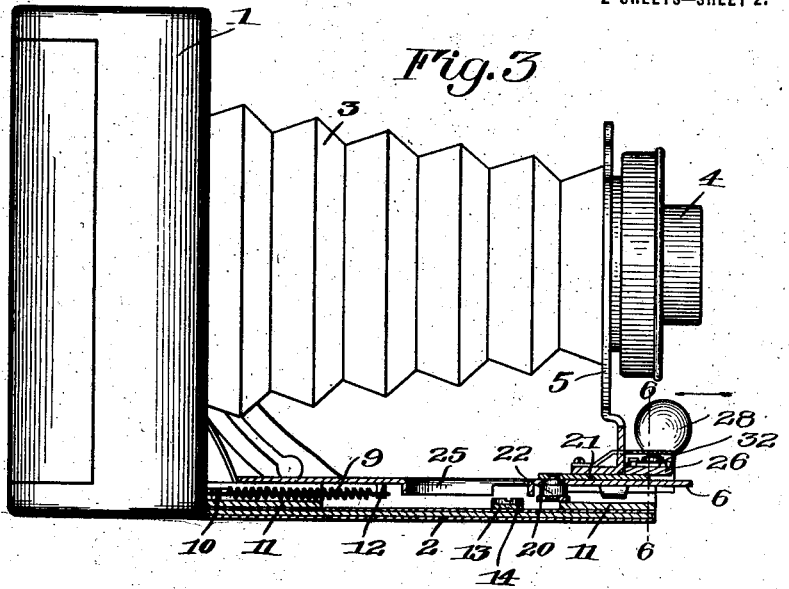
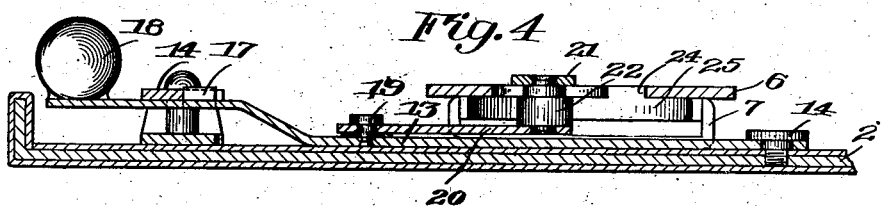
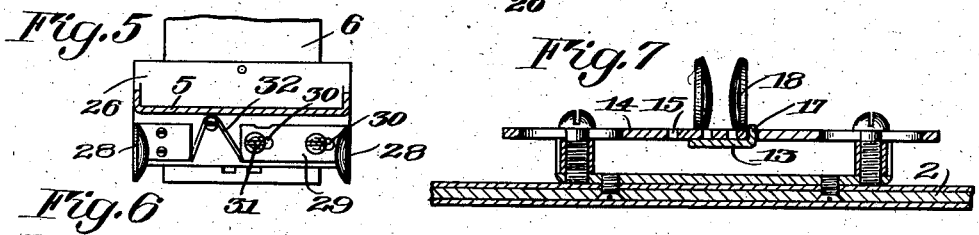
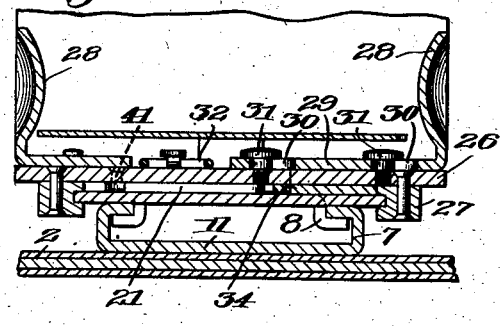
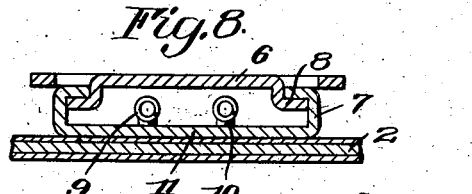
Inventor
Ernest C. Allen
Witnesses
By Church & Rich
his Attorneys

UNITED STATES PATENT OFFICE.

ERNEST C. ALLEN, OF ROCHESTER, NEW YORK, ASSIGNOR TO EASTMAN KODAK COMPANY, OF ROCHESTER, NEW YORK, A CORPORATION OF NEW YORK.

FOCUSING MECHANISM FOR CAMERAS.

1,146,837.  Specification of Letters Patent.  Patented July 20, 1915.

Application filed March 23, 1914. Serial No. 826,792.

*To all whom it may concern:*

Be it known that I, ERNEST C. ALLEN, of Rochester, in the county of Monroe and State of New York, have invented certain new and useful Improvements in Focusing Mechanism for Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras, and it has for its object to provide a simple, effective and convenient focusing device therefor.

The improvements are directed in part to economy in manufacture, ease of assembling and toward providing a quick adjustment that requires little effort and that may be either set for a predetermined focus before the parts are extended or moved to the desired focal position after the controlling focal element has been extended to an approximate position.

To these and other ends the invention resides in certain improvements and combinations of parts all as will be hereinafter more fully described, the novel features being pointed out in the claims at the end of the specification.

Figure 1:
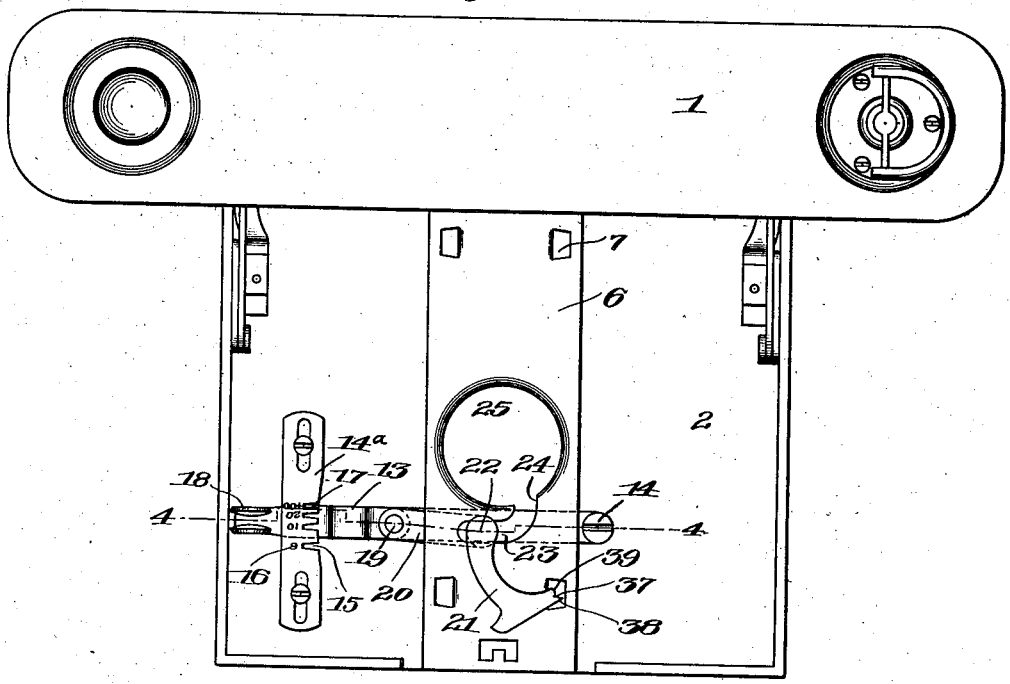
Figure 2:
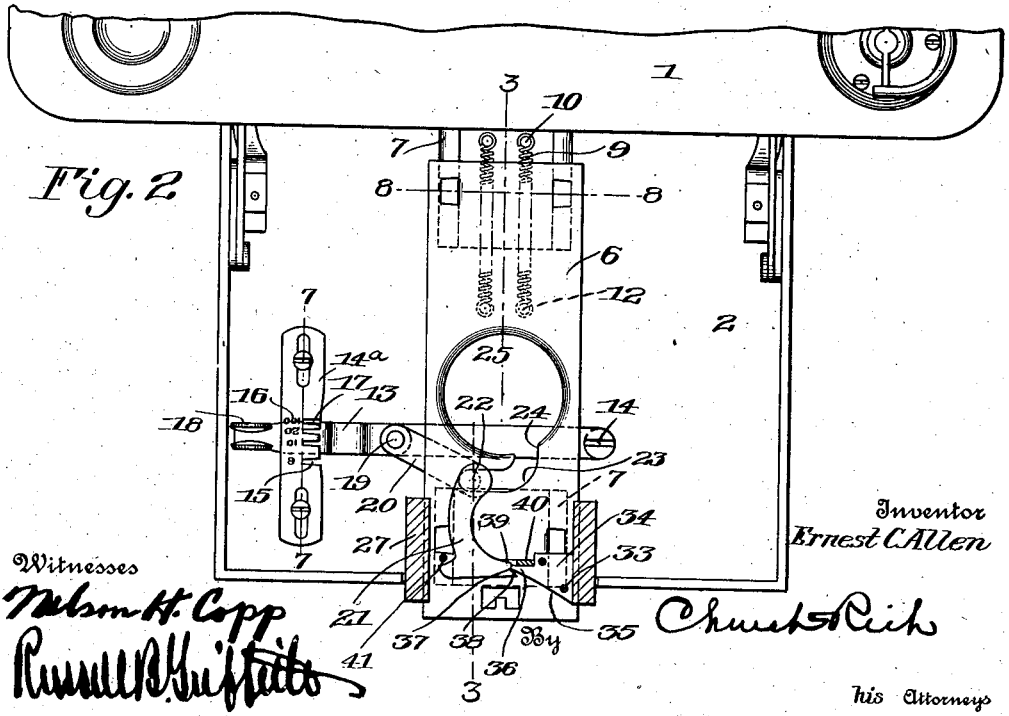

In the drawings, Figure 1 is a top plan view of a camera and camera bed provided with a focusing device constructed in accordance with and illustrating one embodiment of my invention, the lens carriage, however, being removed; Fig. 2 is a similar view with a portion of the camera body broken away and with a portion of the lens carriage shown in horizontal section and in operative or extended position; Fig. 3 is a side elevation of the camera with the parts in focused positions, the bed being shown in horizontal section on the line 3—3 of Fig. 2;
Fig. 4 is an enlarged transverse section through the bed taken substantially on the line 4—4 of Fig. 1; Fig. 5 is a top plan view of the base of the lens carriage taken in section on the line 5—5 of Fig. 3; Fig. 6 is a vertical transverse section through the lens carriage and bed with parts in rear thereof omitted taken substantially on the line 6—6 of Fig. 3; Fig. 7 is a section through the focusing scale on the line 7—7 of Fig. 2, and Fig. 8 is a transverse section through the bed taken substantially on the line 8—8 of Fig. 2.

Similar reference numerals throughout the several figures indicate the same parts.

As is well known, the focusing of a camera is sometimes effected by moving the camera body or back carrying the sensitized surface relatively to the lens, and sometimes by moving the lens relatively to the sensitized surface or back. While features of the invention may be utilized in the first named case, my improvements are more particularly applicable in the last named and more usual arrangement and the invention also shows to best advantage on a camera of the folding type in which the camera bed constitutes a door for closing the camera body after the collapsible bellows and the lens which is attached thereto are folded inside, and which when extended, constitutes a runway for adjusting the lens on a suitable carriage in inward and outward directions.

I have therefore illustrated such a camera in the present instance, and referring more particularly to the drawings, 1 indicates the camera body or casing, 2 the bed and closure or door, 3 the bellows, 4 the lens tube and 5 the lens board or front. The camera is shown only in extended or unfolded position as it is of a well known type. Movable on the main bed 2 within relatively narrow limits is a sliding plate 6 to carry which the bed is fitted at front and rear with short inwardly turned tracks 7 on which the plate slides and beneath which lugs 8 thereon engage. Springs 9 connected at their inner ends to pins 10 on the bed 2 or, more specifically, on the track plate 11, and at their outer ends to pins 12 on the slide 6, have a normal tendency to hold the latter in a retracted position coincident with the bed, as shown in Fig. 1, although the slide may be extended against the tension of the springs in the manner shown in Fig. 2.

Extending transversely of and beneath the slide 6 is a lever 13 pivoted at 14 to the bed 2 and also passing beneath a raised index scale or plate 14ª having a plurality of openings 15 therein provided with indicating characters 16 representing the various focal distances that are most commonly used. The lever 13 is of resilient material and the outer end portion thereof is held under tension to a sufficient extent to cause it to normally press upwardly against the under side of the index plate 14ª which holds a projection 17 thereon in engagement with one or another of the openings 15 to lock the lever against movement on its pivot. It terminates, however, beyond the plate 14 in a finger portion 18 by means of which the lever is vibrated and downward pressure on which permits, by deflection of the lever itself, the disengagement of the projection 17 from a given opening 15 and its reëngagement, selectively, with one of the other openings according to the position to which the lever is adjusted.

Pivoted to the lever 13 at 19 as a fulcrum is the lower arm 20 of a bell crank lever which lever arm lies beneath the slide 6. The other arm 21 of the lever rests on top of the slide so that it is offset vertically from the arm 20 and the two arms are rigidly connected by a cylindrical stud 22 which occupies a transverse slot 23 in the slide plate 6. In order to permit the ready assembling of this lever mechanism with the slide, the slot 23 is extended and made to communicate at 24 with a central opening 25 in the slide, which opening is the one that accommodates the projecting portion of the lens tube 4 when the camera is folded and the bed 2 is closed down in the capacity of a door upon the parts confined within the body. It will be seen that by thrusting the lever 20—21 through this opening 25 its intermediate stud 22 may be easily run into the slot 23 at 24 and after this is done, the pivot 14 of the lever 13 to which the lever 20—21 has been previously pivoted at 19, may be fastened in place. The bell crank lever normally occupies approximately the position shown in Fig. 1 in which it is rocked to the right with its intermediate stud 22 somewhere near the center of the slot 23 and it will be seen that the tendency of the springs 9 acting through the intermediary of the slide 6 is to hold it in this position. Conversely, it will also be recognized that vibration of the lever 20—21 on its fulcrum 19 will cause the slide 6 to be drawn out along the focal line to such an extent as is permitted before the stud 22 reaches the end of its slot 23.

The lens and lens board 5 are mounted on a carriage 26 movable on the slide 6 when the camera is extended and engaged with a short track (not shown) in the camera body 1 when the camera is folded according to a well known arrangement. Depending guide blocks 27 on the under side of the carriage slidably engage the opposite longitudinal edges of the plate 6 as tracks while above, the carriage is provided at opposite sides with opposed finger pieces 28 by means of which it is manipulated. One of these finger pieces (the left one in Figs. 5 and 6) is fixed or rigid, but the other one is carried on a transversely sliding plate 29 having slots 30 that accommodate headed guide pins 31 fixed to the carriage. A spring 32 normally tends to thrust the plate and finger piece outwardly in a direction opposite from the movement naturally engendered by the pressure of the fingers. This sliding plate 29 is provided for a purpose that will hereinafter appear and is to be distinguished from the usual finger piece mechanism of a lens carriage that controls gripping or locking pressure of members corresponding to the members 27 on the slideway. The present members 27 are relatively fixed in themselves allowing a free though stable sliding movement of the carriage at all times.

Fixed to the under side of the carriage by pins 33 is a triangular plate 34 best shown in Fig. 2, which plate has an inclined or cam-like forward edge surface 35 terminating in a pointed abutment 36. When the camera is unfolded and the carriage 26 is drawn out onto the slide 6, it moves freely relatively to the latter until the plate 34 thereon engages the arm 21 of the bell crank lever. With further outward movement, it swings the latter on its fulcrum 19 from the position of Fig. 1 and as the stud 22 thereof slides in the slot 23 it forces the slide 6 outwardly with the carriage at the same time that the latter is moving relatively to the slide, all against the tension of the springs 9. The free end of the bell crank lever 20—21 traverses the cam surface 35 of the plate 34 during these movements and by the time the stud 22 has approximated the end of the slot 23, the pointed abutment 36 at the end of this surface 35 snaps into a notch 37 in the end of the lever arm 21, as shown in Fig. 2. The outer wall 38 of this notch 37 is longer than the inner wall 39 so that while the abutment 36 may slip over the latter, the lever 22 is not given sufficient further movement by reason of its engagement with a stop pin 41 on the under side of the carriage (Fig. 2) to permit the abutment to clear the first mentioned wall. The result is that the lens carriage 26 is locked in both directions in a fixed position on the slide 6 and the slide 6 which is dependent upon the movement of the lever 20—21 is locked in a definite projecting position on the bed 2, though the springs 9 are exerting a retracting tension thereon. The lever 20—21 is therefore seen to be not only an actuating lever for the slide 6 under the influence of the carriage, but a locking member for holding the carriage and slide in interlocked position while they in turn hold it temporarily rigid.

It will be further seen that the lever 13 constitutes a means for shifting the fulcrum 19 of the bell crank lever 20—21 on the bed 2 and hence for varying its throw, the carriage picking it up at an earlier point when the lever 13 is in a forward position, and at a later point when the lever 13 is in a rearward position, as shown in Figs. 1 and 2. The degree of projection of the slide 6 varies in a like manner and the focus of the lens is altered in accordance with the reading of the scale characters 16. This change of focus being controllable within the desired limits by the movement of the slide 6 alone, the carriage 26 may and does come to a stop at the same position on the slide each time, the ultimate position of the lever 20—21 with reference to the slide and carriage being the same each time. The operator need therefore merely set the fulcrum controlling lever 13 at the desired focus, preliminarily, and then pull the lens carriage 26 out as far as it will go, as in a fixed focus camera, and the focus will be true to the estimated distance. To release the carriage and return the parts, the operator need only pinch together the finger pieces 28 and start the carriage rearwardly. With this operation, the sliding plate 29 on which the movable finger piece is carried moves inwardly and a downwardly projecting ear 40 thereon engages the tip of the lever arm 21 and thrusts the lever aside just sufficiently to clear the notch 37, or rather the inner wall 39 thereof, from engagement with the abutment 36 on the carriage, the parts being allowed sufficient play to permit this slight deflection. The carriage is then continued in to its folded position within the camera body but the springs 9 retract the slide 6 which is no longer held extended by the lever 20—21 and this automatic movement of the slide in turn rocks the said lever on its fulcrum 19 back to the position of Fig. 1 with the stud 22 again in the center of the slot 23.

Although the adjustment for focus is preferably arranged by moving the lever 13 to an appropriate position before the lens carriage is drawn out, the focus may be changed afterward while the carriage and slide remain locked together by moving the lever 13. This will be seen to be possible from an inspection of Fig. 2 as, the stud 22 can move to the right in the slot 23 although this movement is taken up as fast as it occurs by the springs 9 which retract the slide 6 to a corresponding extent.

I claim as my invention:

1. In a camera focusing device, the combination with a bed and a slide movable thereon, of a lens carriage supported on the slide, a spring for operating the slide in one direction and means for operating it in the other direction against the tension of the spring.

2. In a camera focusing device, the combination with a bed and a slide movable thereon, of a lens carriage movable on the slide, means for operating the latter in an outward direction and a spring for returning the slide.

3. In a camera focusing device, the combination with a bed and a slide movable thereon, of a lens carriage movable on the slide and also adapted to operate the same in an outward direction and a spring for returning the slide.

4. In a camera focusing device, the combination with a bed and a slide movable thereon, of a lens carriage movable on the slide, and also adapted to operate the same in an outward direction, means actuated by the carriage for locking the slide in its outward position and a spring normally tending to return the slide.

5. In a camera focusing device, the combination with a bed and a slide movable thereon, of a lens carriage movable on the slide and also adapted to operate the same in an outward direction, a spring normally tending to return the slide and a device actuated by the spring and slide for locking the carriage to the latter.

6. In a camera focusing device, the combination with a bed and a slide movable thereon, of a lens carriage movable on the slide and also adapted to operate the same in an outward direction, a spring normally tending to return the slide and a device actuated by the carriage to engaging position and held in engagement by the tension of the spring and slide for locking the carriage on the latter and for locking the slide on the bed.

7. In a camera focusing device, the combination with a bed and a slide movable thereon, of a lens carriage movable on the slide and a single member for both locking the carriage to the slide and for locking the slide in position on the bed.

8. In a camera focusing device, the combination with a bed and a slide movable thereon, of a lens carriage movable on the slide and also adapted to operate the latter on the bed and means for simultaneously locking the carriage to the slide and the slide to the bed in predetermined positions.

9. In a camera focusing device, the combination with a bed and a slide movable thereon, of a lens carriage movable on the slide and means actuated through the relative movement of the slide and carriage for moving the slide on the bed.

10. In a camera focusing device, the combination with a bed and a slide movable thereon, of a lens carriage movable on the slide and means actuated through the relative movement of the slide and carriage for moving the slide on the bed, said means also constituting a locking device for securing the carriage to the bed at a predetermined point.

11. In a camera focusing device, the combination with a bed and a slide movable thereon, of a lens carriage movable on the slide and a lever fulcrumed on the bed and actuated by the carriage for moving the slide on the bed through the movement of the carriage on the slide.

12. In a camera focusing device, the combination with a bed and a slide movable thereon, of a lens carriage movable on the slide, a lever fulcrumed on the bed and actuated by the carriage for moving the slide on the bed through the movement of the carriage on the slide and means for shifting the fulcrum of the lever to vary the movement of the slide.

13. In a camera focusing device, the combination with a bed and a slide thereon, of a lens carriage movable on the slide, a lever fulcrumed on the bed and actuated by the carriage for moving the slide on the bed through the movement of the carriage on the slide and a second lever pivoted to the bed and carrying the fulcrum of the first named lever to shift the same and vary the movement of the slide, said bed lever being adjustable to various fixed positions corresponding to the different focal distances of the lens.

14. In a camera focusing device, the combination with a bed, and a slide movable thereon, of a lens carriage movable on the slide, a lever fulcrumed on the bed and actuated by the carriage for moving the slide on the bed, said lever having an interlocking engagement with the carriage, and means on the bed for shifting the fulcrum of the lever and thereby moving both the slide and carriage together, relatively to the bed.

15. In a camera focusing device, the combination with a bed and a slide movable thereon and provided with a transverse slot, of a lever comprising relatively offset arms, one of which is fulcrumed on the bed and also comprising a connecting portion or stud slidable in the slot on the slide, and a lens carriage movable on the bed to engage the other arm of the lever and thereby move the slide on the bed as the stud on the lever traverses the slot.

16. In a camera focusing device, the combination with a bed and a slide movable thereon and provided with a transverse slot, of a lever comprising relatively offset arms, one of which is fulcrumed on the bed and also comprising a connecting portion or stud slidable in the slot on the slide, and means for shifting the lever fulcrum on the bed to vary the movement of the stud in the slot and hence the movement of the slide.

17. In a camera focusing device, the combination with a bed, and a slide movable thereon, and provided with a central opening and with a transverse slot communicating with said opening, of a lever comprising relatively offset arms, one of which is fulcrumed on the bed and also comprising a connecting portion or stud slidable in the slot on the slide and adapted to be inserted therein, initially, by thrusting the lever through the central opening, and a lens carriage movable on the bed to engage the other arm of the lever and thereby move the slide on the bed as the stud on the lever traverses the slot.

18. In a camera focusing device, the combination with a bed and a slide movable thereon, of a lens carriage movable on the slide, a lever fulcrumed on the bed and a cam surface on the carriage adapted to engage the lever for moving the slide on the bed through the movement of the carriage on the slide.

19. In a camera focusing device, the combination with a bed and a slide movable thereon, of a lens carriage movable on the slide, a lever fulcrumed on the bed to engage the slide and having a notch therein and a cam surface on the carriage adapted to engage the lever, said cam surface terminating in an abutment adapted to engage the notch in the lever and to lock the latter, the carriage and the slide in a predetermined position.

20. In a camera focusing device, the combination with a bed and a slide movable thereon, of a lens carriage movable on the slide, a lever fulcrumed on the bed to engage the slide and having a notch therein, said lever being arranged to be vibrated by the movement of the carriage on the slide, and an abutment on the carriage adapted to engage the notch in the lever and to lock the latter, the carriage and the slide in a predetermined position.

21. In a camera focusing device, the combination with a bed, and a slide movable thereon, of a lens carriage movable on the slide, a device actuated by such movement of the lens carriage for moving the slide on the bed and also adapted to lock the slide and carriage in predetermined positions and a finger piece on the carriage for releasing said locking means when it is desired to return the carriage.

ERNEST C. ALLEN.

Witnesses:
RUSSELL B. GRIFFITH,
H. E. STONEBRAKER.